(12) United States Patent
Zhou et al.

(10) Patent No.: US 9,104,872 B2
(45) Date of Patent: Aug. 11, 2015

(54) MEMORY WHITELISTING

(75) Inventors: Mian Zhou, Dallas, TX (US); William Scott Treadwell, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 905 days.

(21) Appl. No.: 12/695,490

(22) Filed: Jan. 28, 2010

(65) Prior Publication Data

US 2011/0185417 A1 Jul. 28, 2011

(51) Int. Cl.
 G06F 21/00 (2013.01)
 G06F 21/56 (2013.01)
(52) U.S. Cl.
 CPC ................................ G06F 21/566 (2013.01)
(58) Field of Classification Search
 USPC ........................................................... 726/22
 See application file for complete search history.

(56) References Cited

U.S. PATENT DOCUMENTS

| 6,810,398 | B2 | 10/2004 | Moulton |
| 2005/0132184 | A1* | 6/2005 | Palliyil et al. ................. 713/152 |
| 2007/0038677 | A1* | 2/2007 | Reasor et al. ................. 707/200 |
| 2008/0103978 | A1* | 5/2008 | Houston ........................ 705/59 |
| 2008/0183996 | A1* | 7/2008 | Field et al. ..................... 711/163 |
| 2008/0289038 | A1* | 11/2008 | Kim et al. ....................... 726/22 |
| 2009/0083852 | A1 | 3/2009 | Kuo et al. |
| 2009/0249492 | A1* | 10/2009 | Boesgaard Sorensen ...... 726/27 |
| 2010/0077482 | A1* | 3/2010 | Adams ............................ 726/24 |

OTHER PUBLICATIONS

Jesse Kornblum, "Identifying almost identical files using context triggered piecewise hashing", Digital Investigation 3S (2006) S91-S97, 7 pages.

* cited by examiner

*Primary Examiner* — William Goodchild
(74) *Attorney, Agent, or Firm* — Banner & Witcoff, Ltd.; Michael A. Springs (57) ABSTRACT

An enhanced whitelisting module associated within a system whitelists unknown files for execution on the system. The whitelisting module may oversee the computation of a hash of a file loaded into the memory and comparison of the hash to hashes within a hash table generated from clean files located on a clean system. The whitelisting module may communicate to a device internal and/or external to the system to retrieve the hash table of clean files. In certain embodiments, a rolling hash (or other piecewise hash) may be used to determine the location and/or extent of the differences between a modified file and a clean file.

18 Claims, 5 Drawing Sheets

PROCESS NAME: csrss.exe
--------------------------------------------------
Process ID = 0x00000584
csrss.exe : total 14 modules \??\C:\WINNT\system32\csrss.exe
Base: 0x4A680000, EntryPoint: 0x4A6811A3, Size: 0x00005000
Rolling hash: 96:1jdCAN1CnotgbZm4vU/93SqYs5NEW5RtnWwG:1jdCANooygp/ZSq/5mW5RtnW C:\WINNT\system32\ntdll.dll
Base: 0x7C900000, EntryPoint: 0x7C912C28, Size: 0x000AF000
Rolling hash: 12288:ZBjQDQztygWlkpl6GVJ0stJIJxJ4zU3pN3I5Mx7SonMz:ZRQDQzkR3UM C:\WINNT\system32\CSRSRV.dll
Base: 0x75B40000, EntryPoint: 0x75B465EB, Size: 0x0000B000
Rolling hash: 768:/9hfKmWVhOlqy+qSoaY0osq1iPooFkfW:1RdWVcky+lbqzoFkfW

FIG. 5

MEMORY WHITELISTING

TECHNICAL FIELD

Aspects of the invention generally relate to detection of compromised files within a computer system. In particular, various aspects of the invention include a framework for using a hash algorithm on executable files in memory to determine whether or not one or more files have been compromised.

BACKGROUND

Computer systems in today's computing environments are constantly facing attacks from malicious software (malware). Malware may include computer viruses, worms, trojan horses, rootkits, spyware, adware, crimeware, and other malicious software that may cause unwanted changes to executable files. These changes could materialize in different ways. In the simplest scenario, a change could be in the name of the executable file that any user can see with tools such as windows task manager. Other changes may include a change in the process behavior and in the behavior of modules upon which a process relies. Therefore, it is important to develop tools that help detect, mitigate, and/or eliminate the risks associated with malware.

Meanwhile, hashing is a process by which data is encoded by using an algorithm to produce a unique fixed-sized bit string (e.g., the hash) for each unique block of input data. For a hash algorithm (e.g., SHA1, MD5, and the like) to be useful, it must be computationally intractable to reverse engineer the block of data from the hash and a modification of the input data must also necessarily produce a change in the hash. Hashes are often used in information security and authentication applications, such as for the detection of malware that has infiltrated a computing system.

To utilize a hashing algorithm for authentication purposes, a security program may perform a hash of static executable files stored on the hard drive of a "clean" computing system. These hash values may then be compared to the hash values generated for potentially modified versions of the static executable files. If a difference exists between the hash values found on the clean system versus those found on the system under study, a red flag may be raised and appropriate action may be taken to shut down the system and/or purge the suspicious files.

Unfortunately, the comparison of hash values for files resident on the hard drive (e.g., static files at rest) has certain drawbacks. For instance, trivial modifications to the file would change the hash value and may unnecessarily cause risk mitigation countermeasures to be implemented. One common example of a trivial modification that some viruses cause in files in order to defeat whitelisting is the creation of a null byte at the end of a file. In such scenarios, a legitimate program would be prevented from running, thereby causing an undesirable disruption of service that could result in loss of time and money.

As another example of how malicious changes may be made to executable files, DLL (dynamic-link library) injection may force an unsuspecting running executable file to accept a DLL that has been tampered. Here, DLL code is injected directly into the memory space of the executable process, thereby causing the executable file to run compromised code. In general, DLL injection may change the behavior of the original DLL and, consequently, may change the behavior of any running process that relied on that DLL, similar to the changes oftentimes produced by a rootkit. Again, the conventional technique of comparing the hash values for files resident on the hard drive will not perform as desired because processes such as DLL injection occur only after the executable file has been loaded into memory.

The drawbacks of performing a traditional hashing algorithm on static files are only exacerbated by the fact that traditional hashes such as MD5 and SHA1 take the input data as a whole and produce a single fingerprint. Any trivial change (e.g., the creation of a null byte as discussed above) to the input data, which may not necessarily change process behavior associated with data, would create two completely different hash results. By evaluating the two completely different hash results, no determination may be made as to the location and/or extent of the changes to determine whether or not the file including the data may be properly whitelisted.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable media, and apparatuses for a memory whitelisting tool configured to detect compromised files on a computing device. Aspects may be used to hash a program executable file loaded into memory so that any changes to the executable file when compared to a clean version of the file may be detected.

With another aspect of the disclosure, the memory whitelisting tool may run as a periodic or continuous service that may scan programs in memory to make sure that their hash values have not deviated or changed.

With yet another aspect of the disclosure, a rolling hash algorithm may be implemented in the memory whitelisting tool to hash a program executable file loaded into memory so that the number and/or location of changes to the file may be determined when compared to a clean version of the file.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, there are problems associated with the way computer files are whitelisted. A more robust methodology is needed to ensure that appropriate executable files are whitelisted for use on a computing system.

In accordance with certain aspects of the disclosure, executable files that have been loaded into memory may be examined to determine whether a computing system is clean, or whether the computing system has been compromised by malware. In this way, malware introduced only after executable files have been loaded into memory can be detected and, consequently, defeated. Before a compromised executable file may be identified in memory, the system and/or method may determine what processes should be running in the memory of a clean system. Then, a whitelisting tool/module (e.g., a computing device with program instructions, a computer application, and the like) in a computer system with files of unknown origin may detect unauthorized changes to the executable files to point to potentially compromised versions of the files. Alternatively, the whitelisting module may be located in a system with known clean files in communication with the unknown system. Throughout this disclosure, the term "whitelisting tool" and/or "whitelisting module" may be used interchangeably to represent the computing device storing program instructions enabling enhanced whitelisting functions as described herein and/or the program instructions themselves.

The analysis of program executable files in memory may be more useful than the analysis of static files on a hard drive as discussed in the prior art because the behavior of a program executable file is ultimately governed by the memory image of its executable content at run time (e.g., what has been loaded into the memory at run time determines the behavior of a program executable file). The detection of any changes to the memory image content of a program executable when compared to the memory image of a clean version of the executable file may result in the modified executable file being flagged as suspicious.

While the whitelisting module may allow an executable file to load into memory, the whitelisting module may prevent the file from executing. The executable file may be allowed to load into memory so that the entire program as it would normally run may be analyzed, prior to actually executing the program. As part of this analysis, the executable file laid out in memory may be hashed and compared to one or more hashes in memory of clean files from a corresponding system (e.g., a system that runs similar processes as the system under study).

In addition, in accordance with other aspects of the disclosure, once an executable file is loaded into memory, a rolling hash may be used to provide more information regarding any differences between modified and clean versions of files, including the location and/or extent (e.g., character changes, insertions, deletions, swaps, and the like) of the differences. Although the rolling hash is discussed in detail throughout this disclosure, this implementation may use any other hash that may be applied to achieve similar results (e.g., any other hash relying on piecewise hashing).

In considering a match between a clean file and an unknown file, the rolling hash may be much more forgiving than a traditional hash (MD5, SHA1, and the like) on a few inconsequential bytes that may have been modified. For example, the rolling hash may indicate that a file of unknown origin is clean if only trivial changes are made to the unknown file when compared to a known clean file. The rolling hash may "roll" through a string input using a window of a certain size and produce multiple hash values using content in the window as the window moves from the beginning to the end of input. That way, with the right window size, the degree of change between a modified file and a clean file may be determined. Because both the location and extent of the modifications in a unknown file may be determined, the whitelisting tool may assess whether or not a program file may have been truly been modified or whether, by loading the program file into memory, some bytes within the program file may have been switched or optimized, which may happen for a variety of reasons. By comparing the hash codes of the processes running in memory with their clean counterparts, illegitimate or tampered running processes within the computer system may be detected in real time.

Thus, this algorithm may defeat malware that may hide itself as a modification to originally clean files. In addition, this process may defeat malware that may cause a denial of service when legitimate files are prevented from being whitelisted (and thus executed) through trivial modifications to the original file. In yet other aspects, this implementation may defeat programs that inject themselves into running applications in memory (e.g., DLL injection, and the like). Once a program executable file has been whitelisted, the whitelisting tool in the computer system may allow the program to run and may not check the file again. In other embodiments, the whitelisting tool may periodically check the files even after the initial screening in order to detect threats that manifest themselves at later times.

Figure 1:
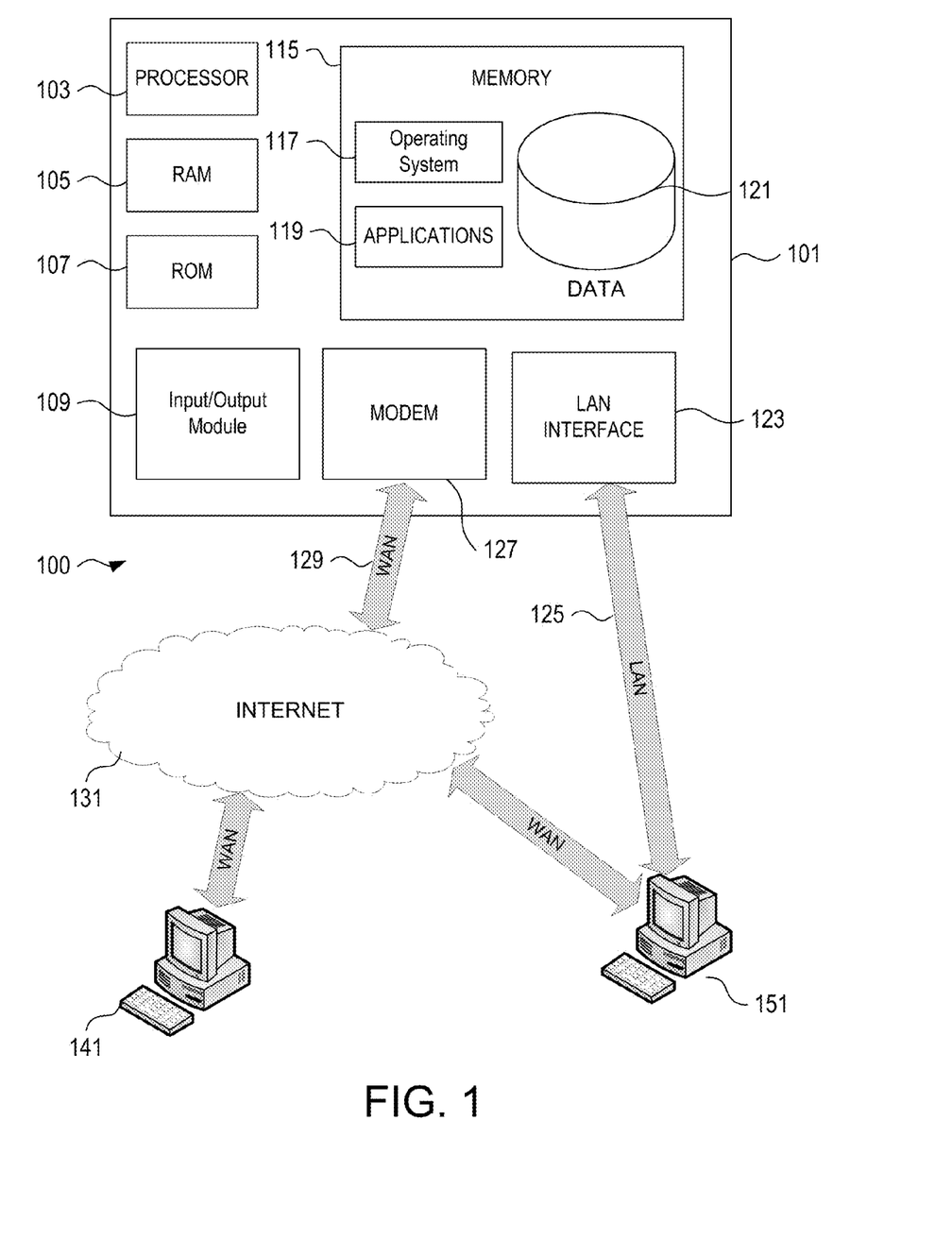
FIG. 1 shows an illustrative operating environment in which various aspects of the disclosure may be implemented.

FIG. 1 illustrates a block diagram of an enhanced whitelisting module/tool 101 (e.g., a computing device) in communication system 100 that may be used according to an illustrative embodiment of the disclosure. The device 101 may have a processor 103 for controlling overall operation of the whitelisting module 101 and its associated components, including RAM 105, ROM 107, input/output module 109, and memory 115.

I/O 109 may include a microphone, keypad, touch screen, and/or stylus through which a user of whitelisting module 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of program instructions to hash executable files loaded into memory 115. The program instructions may be run only once when the files are initially loaded into memory 115 and/or periodically so that new threats may be detected. Processor 103 may also be responsible for comparing the hash results of clean files with the hashes of unknown files retrieved from an unknown system. Upon comparison of these hashes, processor 103 may cause the execution of program instructions to compute an edit distance and/or a match score to quantify the similarity of the hash associated with a file of unknown origin with the hash of a clean file.

The device 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may house "clean copies" and corresponding "clean hashes" of all the files that may be run on device 101. The network connections depicted in FIG. 1 include a local area network (LAN) 125 and a wide area network (WAN) 129, but may also include other networks. When used in a LAN networking environment, the device 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Also, an application program 119 used by the enhanced whitelisting tool 101 according to an illustrative embodiment of the disclosure may include additional computer executable instructions for invoking functionality related to hashing files loaded into a memory.

Whitelisting tool 101 and/or terminals 141 or 151 may also be mobile terminals including various other components, such as a battery, speaker, and antennas (not shown).

This disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like, that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
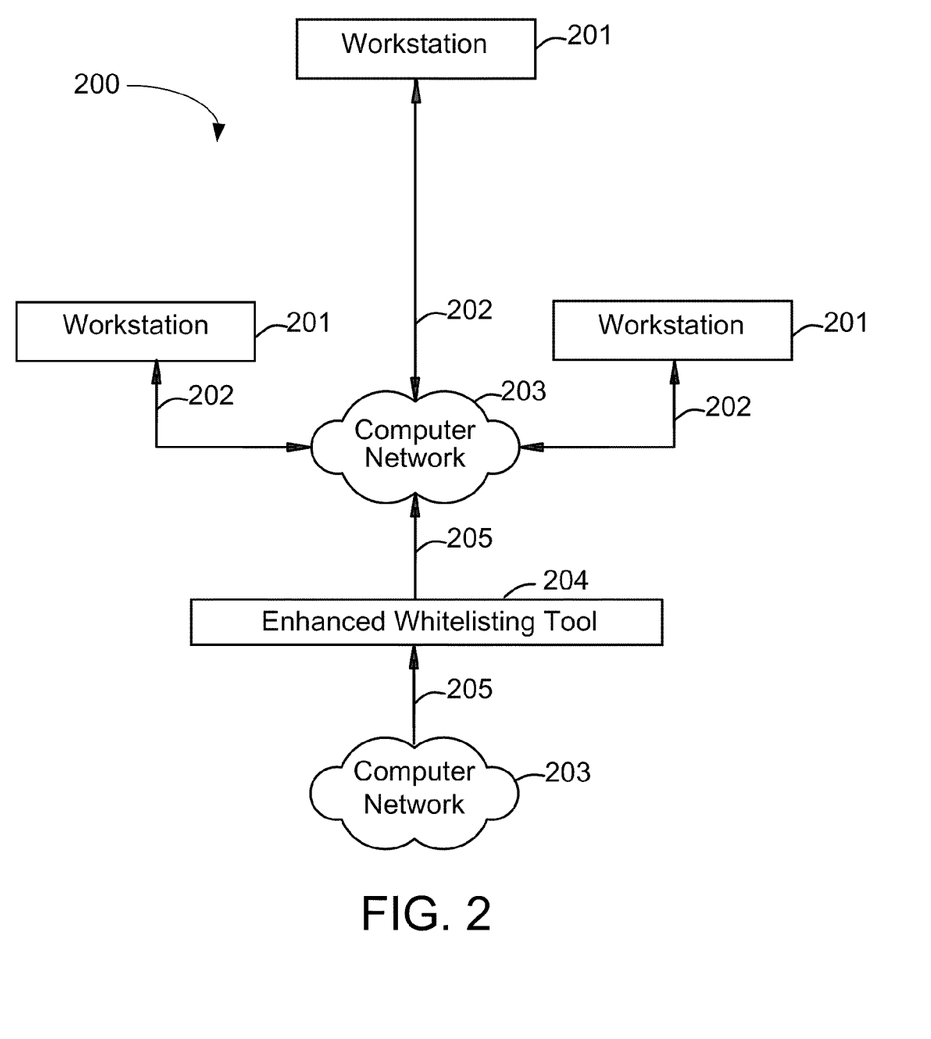
FIG. 2 is an illustrative block diagram of workstations and computers that may be used to implement the processes and functions of certain aspects of the disclosure.

Referring to FIG. 2, an illustrative system 200 for implementing methods according to the disclosure is shown. As illustrated, system 200 may include one or more workstations 201. Workstations 201 may be local or remote, and are connected by one or more communications links 202 to computer network 203 that is linked via communications links 205 to enhanced whitelisting tool 204. In certain embodiments, workstations 201 may house clean copies of all the relevant files and/or clean copies of hashes for these files. In other embodiments workstations 201 may be different points at which the whitelisting tool 204 may be accessed. In system 200, whitelisting tool 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and enhanced whitelisting tool 204, such as network links, dial-up links, wireless links, hard-wired links, and the like.

The steps that follow in the Figures may be implemented by one or more of the components in FIGS. 1 and 2 and/or other components, including other computing devices.

Figure 3:
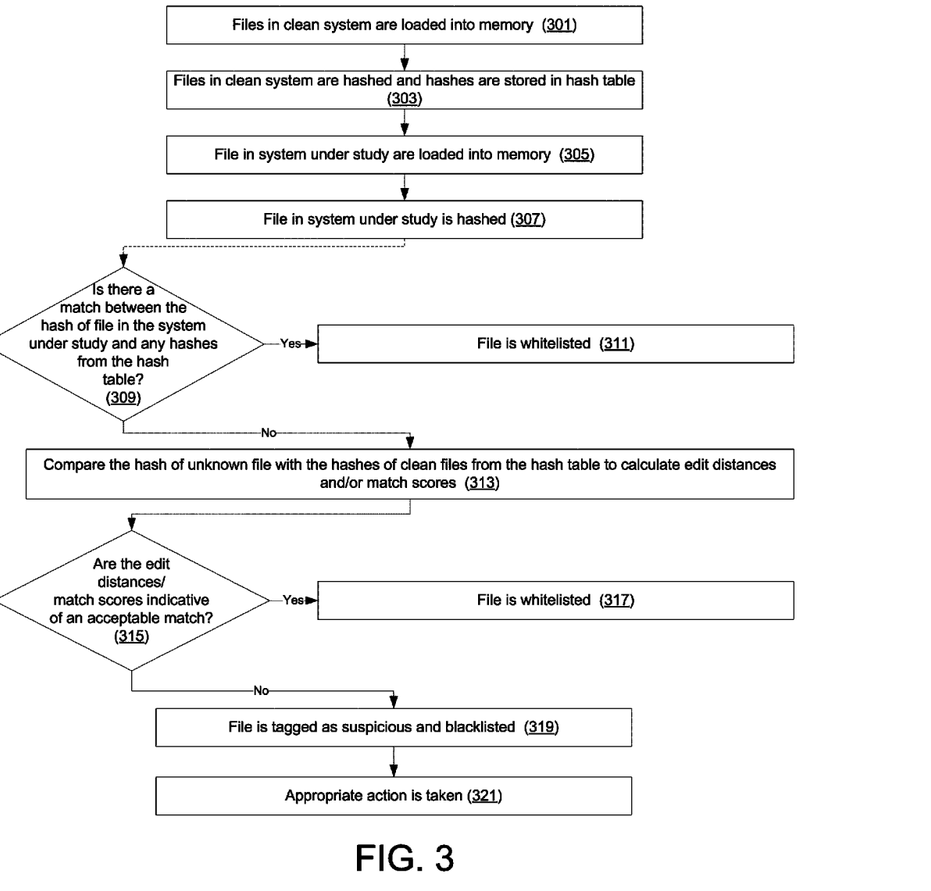
FIG. 3 shows a method for whitelisting files loaded into memory in accordance with various aspects of the disclosure.

FIG. 3 shows a method for whitelisting files loaded into memory in accordance illustrative aspects of the disclosure. The process starts at step 301 where executable files in a clean system may be loaded into a memory. Then the files in the clean system may be hashed (using any piecewise hash, e.g., the rolling hash) and the hashes are stored in a hash table for future access at step 303. In some embodiments, this hash table may be stored in memory (e.g., memory 115) of the clean system itself while in other embodiments the hash table may be transmitted to other computing devices within a network and stored locally in a locked file. When the hash table is stored in the clean system itself, the table may be transmitted to a system with files of unknown origin when a comparison must be made with the clean files. Alternatively, to avoid exposing the clean hashes to tampering over a network, hashes of files of unknown origin may be transmitted to the clean system for further processing. These protocols may provide added security in instances where the system under study handles information that is highly sensitive and/or confidential (e.g., automatic teller machines, classified documents, and the like.)

Once the clean system has been properly analyzed, any given file in a system under study may be loaded into memory in step 305. Once this file is hashed using the same hashing algorithm as was used for the files in the clean system in step 307, the unknown system may transmit the hash of the unknown file to the clean system or the clean system may transmit the hash table to the unknown system. The process then may move to step 309 where a decision is made by either the clean system or the unknown system (depending on the communication scheme taking place) as to whether or not there is an exact match between the file in the system under study and any hashes within the hash table generated from files in a corresponding clean system. If there is an exact match, then the file may be whitelisted in step 311. If there is not an exact match, then the process may move to step 313, where the system may compare the hash of the unknown file with hashes from the hash table to calculate edit distances and/or match scores between the hash of the unknown file and the hashes from the hash table. In other embodiments, the process may directly move from step 307 to step 313, without first checking to see if there is an exact match between a hash in the hash table and the hash of the unknown file. Step 309 and step 311 are thus optional and this is indicated by a dashed arrow between step 307 and step 309 in FIG. 3.

The edit distance may be defined as the minimum number of bit changes required to change the hash of the file in the system under study to a hash of the file in the clean system. The edit distance may be "weighted" to reflect the severity of certain changes over others. For instance, in one embodiment, a change in a hash due to a simple insertion and/or deletion of a character may be scored as a difference of one but a change in the hash due to a change of a character may be scored as a difference of two. Further, a change in the hash due to a swap of characters (e.g., a reverse order of the right characters) may be scored as a difference of six. In this way, the weighted edit distance may quantitatively reflect how similar or dissimilar two files may be. The weights assigned to the changes may be chosen and dynamically changed by a user to highlight changes that may be particularly important to the user.

A match score may also be computed from the edit distance. The match score may be a rescaled version of the edit distance such that a match score of 0 may represent no similarity between the two files being compared and a match score of 100 may indicate identical files. In other embodiments, a different threshold and/or scale may be used to represent the degree of a match between an unknown file and a file from a clean system.

The process then may move to decision step 315 where the system may decide whether or not the edit distance and/or match score is indicative of an acceptable match. If the edit distance and/or match score are acceptable, the unknown file may be whitelisted in step 317. An acceptable edit distance and/or match score may be user-defined parameters. Depending on the hash algorithm used, any match score above 0 may indicate that two files may have originated from the same source. In other embodiments, an edit distance and/or match score above another threshold value may be deemed to reflect an acceptable level of similarity between two files.

If the clean file and the file under study do not have an acceptable match score/edit distance, the unknown file may be tagged as suspicious and blacklisted in step 319. Then appropriate action may be taken in step 321. Action may include a shut down of the system under study, purging of the suspicious file from the unknown computing system, and/or quarantining the file for further study, among other things. If the match score/edit distance is computed on the clean system, the clean system may transmit this information to the system of unknown origin so that appropriate white/blacklisting actions may be taken.

Figure 4:
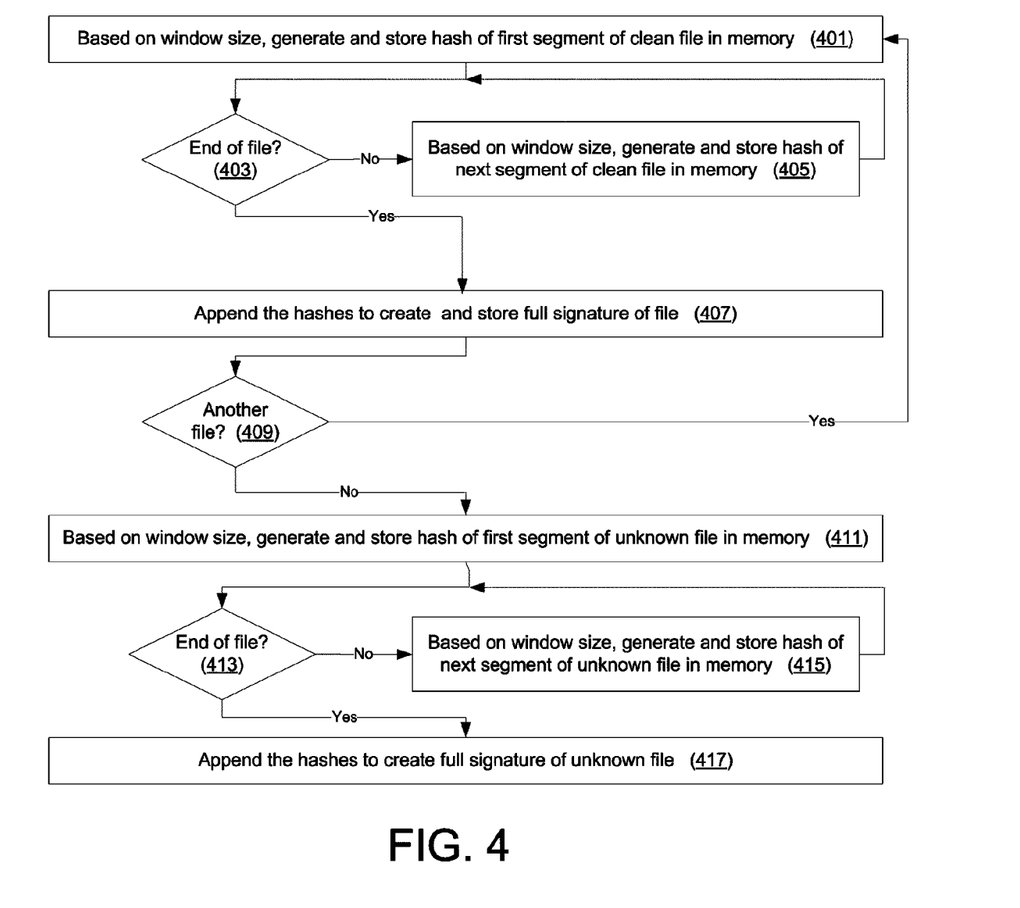
FIG. 4 shows a process for generating a rolling hash of clean and unknown files in memory in accordance with various aspects of the disclosure.

FIG. 4 shows a process for generating a rolling hash of clean and unknown files in memory in accordance with at least one aspect of the disclosure. The process may start out in step 401 where, based on a chosen window size, a hash algorithm may be used to generate and store a hash of the first segment of a clean file in memory. The window size may be a user-defined parameter that may allow a certain number of bits/characters to be hashed at a given time. Again, as discussed above, the partial hashes of files in the clean system may be stored on the clean system itself and/or other computing devices within the network (e.g., network 200). The process may then move to decision step 403 where the system may decide if it has reached the end of the file. If the system has not reached the end of the file, the process may move to step 405 where, based on the window size, the system may generate and store a hash of the next segment of the clean file in memory. As indicated in FIG. 4, this process repeats until all the segments within the file have been hashed. The hashed output from each window may then be appended to create and store a full "signature" of the file in step 407. In some embodiments, only a portion of each hash (e.g., the least significant bit (LSB), and the like) may be appended to create the signature of the file. The process then may move to step 409 where the system may decide if there is another file to hash. If more files exist, the process may move back to step 401 where a new file is analyzed in the same way as the previous one (e.g., hashing of each segment of the new file in sequence).

If no new files exist, the process may move to step 411 where the first segment of an unknown file may be hashed based on the window size. In some embodiments, the unknown files may be hashed directly on the unknown system before the hashes of the unknown files are transmitted to a clean system for the hash comparison. In other embodiments, the hash table of clean files is transmitted to the unknown system. As before with the clean file, the system may decide if it has reached the end of the file in step 413; if the end of the file has not been reached, the next segment of the unknown file in memory may be hashed in step 415. When all segments of the file have been hashed, all of the hashes may be appended to create a full signature of the unknown file in step 417. As before, in some embodiments, only a portion of each hash (e.g., the least significant bit (LSB), and the like) may be appended to create the signature of the file.

When a comparison of the hash of a clean file and a hash of a file in an unknown system is made (e.g., in step 313), the use of the rolling hash may allow a user to identify the location of any differences between the two files, as changes may be attributed to a particular window within the file. In addition, depending on the strength of the hash used, the difference between two hashes may provide probative information regarding the differences between the clean file and the file under study for the particular window being hashed.

Aspects of the disclosure may have a number of execution models. In some embodiments, the whitelisting tool 204 may be executed on the clean/unknown system before a program file is executed (but after the program file has been loaded into memory). Alternatively, tool 204 may be run as a continuous or periodic service, scanning programs in memory and making sure that their hash values have not deviated or changed. This implementation may help to identify malicious files that result from attacks such as buffer overflows. Upon detecting malware, device 101 may choose to close down the suspicious program, thereby preventing further exploitation.

Figure 5:
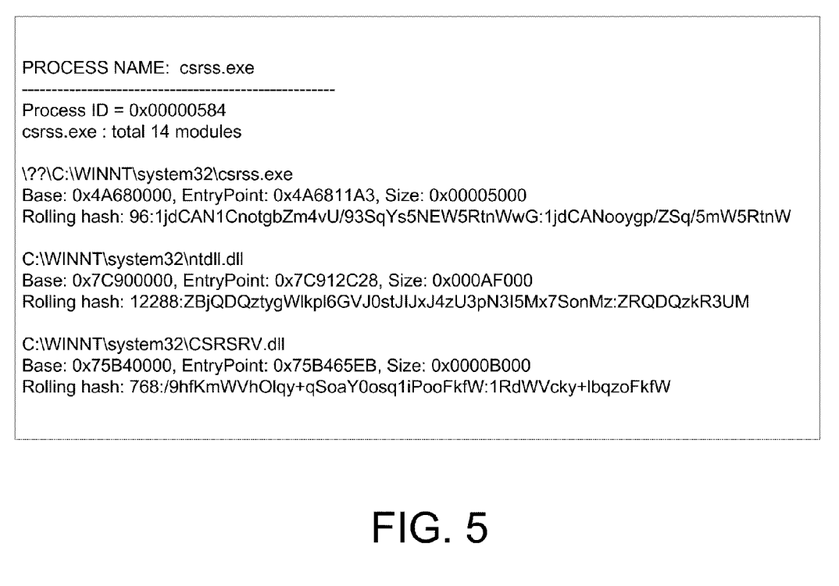
FIG. 5 shows a sample output generated for a file being hashed using a rolling hash algorithm in accordance with various aspects of the disclosure.

As an example, consider the case where an executable file named "csrss.exe" has been hashed using the rolling hash for whitelisting purposes. A portion of a sample output generated when using the rolling hash is shown in FIG. 5. The sample output includes the process name (csrss.exe) and the number of modules the process used (14). For simplicity only three of the modules are shown (e.g., csrss.exe, ntdll.dll, and CSRSRV.dll). The sample output also shows the hash code of the process memory page (e.g., 96:1jdCAN1CnotgbZm4vU/93SqYs59EW5RtnWswG: 1jdCANooygp/ZSq/52W5RtnW) and the hash code of each DLL module that is used in the process.

The hash results may be understood by evaluating the three portions between the two colons separately. For example, for the hash result of csrss.exe, the first part of the result (96) represents an optimized window size used for the rolling hash. The second part of the result (1jdCAN1CnotgbZm4vU/93SqYs59EW5RtnWswG) may represent the hash signature of a clean version of the file and the third part of the result (1jdCANooygp/ZSq/52W5RtnW) may represent the hash signature of the unknown file. The two hash results may be compared character by character to generate a match score. The higher the match score, the more likely it is that the hash signatures and the corresponding files came from a common ancestor.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
   (i) loading a plurality of known clean files into a volatile computer memory, the computer hashing the plurality of known clean files to generate a plurality of first hashes in a table;
   (ii) receiving a second hash of an unknown file, the second hash generated on an unknown system;
   (iii) storing the second hash in a nonvolatile memory;
   (iv) using a processor of the computer, comparing the plurality of first hashes in the table with the second hash to compute match scores, wherein the match scores are indicative of a relative degree to which the plurality of hashes in the table and the unknown file are similar to accommodate for trivial changes in the unknown file and wherein the match scores are determined using weights to reflect the severity of certain changes and wherein the weights are configured to be dynamically changed by a user; and
   (v) determining whether there is a match between the second hash and one of the plurality of first hashes in the table, wherein if there is a match between the second hash and one of the plurality of the first hashes in the table whitelisting the unknown file;
   (vi) wherein if there is not a match between the second hash and one of the plurality of the first hashes in the table determining whether the match scores are above a designated threshold numerical value that is between a first numerical value and a second numerical value greater than the first numerical value, and whitelisting the unknown file;
   (vii) transmitting the match scores information to the unknown system; and
   (viii) periodically checking the whitelisted unknown file for further threats.

2. The method of claim 1, wherein the first hash is computed using a rolling hash algorithm.

3. The method of claim 1 further comprising: when the match scores are below the first numerical value, preventing the unknown file from executing on the unknown system.

4. The method of claim 3, wherein the unknown file is purged from the unknown system.

5. The method of claim 3, wherein the unknown system is shut down in response to the unknown file being prevented from executing.

6. The method of claim 1, wherein the plurality of first hashes are stored in a locked file on the computer.

7. A non-transitory computer-readable storage medium having computer-executable program instructions stored thereon that when executed by a processor, cause the processor to perform steps comprising:
   (i) loading an unknown file into a volatile memory;
   (ii) hashing the unknown file to generate a first hash;
   (iii) transmitting the first hash to a secure computer system; and
   (iv) receiving a match score computed from a comparison between the first hash and a plurality of second hashes in a hash table, wherein the match score is indicative of a relative degree to which the plurality of second hashes in the hash table and the unknown file are similar to accommodate for trivial changes in the unknown file and wherein the match score is determined using weights to reflect the severity of certain changes and wherein the weights are configured to be dynamically changed by a user, wherein the plurality of second hashes were generated using known clean files;
   (v) determining whether there is a match between the first hash and one of the plurality of second hashes in the table, wherein if there is a match between the first hash and one of the plurality of second hashes in the table whitelisting the unknown file;
   (vi) wherein if there is not a match between the first hash and one of the plurality of second hashes in the table determining whether the match score is above a designated threshold numerical value that is between a first value and a second numerical value greater than the first numerical value, whitelisting the unknown file;
   (vii) transmitting the match score information to the unknown system; and
   (viii) periodically checking the whitelisted unknown file for further threats.

8. The non-transitory computer-readable storage medium of claim 7, wherein the computer-executable instructions further perform: blacklisting the unknown file when the match score is below the first numerical value.

9. The non-transitory computer-readable storage medium of claim 8, wherein the computer-executable instructions further perform: purging the blacklisted file.

10. The non-transitory computer-readable storage medium of claim 8, wherein the computer-executable instructions further perform: preventing the blacklisted file from executing.

11. The non-transitory computer-readable storage medium of claim 10, wherein the computer-executable instructions further perform: shutting down the processor.

12. The non-transitory computer-readable storage medium of claim 7, wherein the computer-executable instructions further perform: repeating steps (i) to (iv) at predetermined intervals to blacklist the unknown file when a new threat is discovered.

13. The non-transitory computer-readable storage medium of claim 7, wherein the first hash is generated using a rolling hash algorithm.

14. An apparatus comprising:
   (i) a communication module configured to communicate with an unknown system to receive a hash of an unknown file loaded into a first volatile memory of the unknown system; and
   (ii) a processor configured to compute a rolling hash of a plurality of clean files within a second volatile memory to generate a hash table and to compare the hash table with the hash of the unknown file by generating a match score wherein the match score is indicative of a relative degree to which the hash table and the hash of the unknown file are similar to accommodate for trivial changes in the unknown file and wherein the match score is determined using weights to reflect the severity of certain changes and wherein the weights are configured to be dynamically changed by a user;
   (iii) a whitelisting module configured to whitelist the unknown file stored on the unknown system, when there is a match between the hash of the unknown file and the hash table;
   (iv) the whitelisting module further configured to whitelist the unknown file when there is not a match between the hash of the unknown file and the hash table when the match score is above a designated threshold numerical value that is between a first numerical value and a second numerical value greater than the first numerical value;
   (v) transmitting the match score information to the unknown system; and
   (vi) periodically checking the whitelisted unknown file for further threats.

15. The apparatus of claim 14, wherein a nonvolatile memory is configured to store the hash table locally in a locked file.

16. The apparatus of claim 14, wherein the unknown system is an automatic teller machine.

17. The apparatus of claim 14, wherein the whitelisting module further blacklists the unknown file when the match score comparing the received hash and each hash from the hash table is below the first numerical value.

18. The apparatus of claim 14, wherein the second volatile memory is a part of a known clean computer system.

* * * * *